(12) United States Patent
Mo et al.

(10) Patent No.: US 11,055,644 B2
(45) Date of Patent: Jul. 6, 2021

(54) PACKAGE DELIVERY SUB-ROUTE ASSIGNMENTS TO DELIVERY WORKERS BASED ON EXPECTED DELIVERY EFFICIENCY

(71) Applicant: COUPANG CORP., Seoul (KR)

(72) Inventors: Wenting Mo, Beijing (CN); Ying Qin, Shanghai (CN); Xingzhu Gu, Shanghai (CN); Jin Hyun Kim, Beijing (CN); Xiufang Zhu, Beijing (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/583,115

(22) Filed: Sep. 25, 2019

(65) Prior Publication Data

US 2020/0265367 A1 Aug. 20, 2020

Related U.S. Application Data

(63) Continuation of application No. 16/278,709, filed on Feb. 18, 2019, now Pat. No. 10,467,563.

(51) Int. Cl.
*G06Q 10/06* (2012.01)
*G06Q 10/04* (2012.01)
(Continued)

(52) U.S. Cl.
CPC ..... *G06Q 10/063112* (2013.01); *G06F 16/29* (2019.01); *G06Q 10/047* (2013.01); *G06Q 10/06315* (2013.01); *G06Q 10/08355* (2013.01)

(58) Field of Classification Search
CPC ........... G06Q 10/08; G06Q 10/063116; G06Q 10/06316; G06Q 10/06311; G06Q 10/06;
(Continued)

(56) References Cited

U.S. PATENT DOCUMENTS 5,272,638 A 12/1993 Martin
5,636,122 A 6/1997 Shah
(Continued)

FOREIGN PATENT DOCUMENTS

JP H08-161026 A 9/1994
JP 2010-039961 A 2/2010
(Continued)

OTHER PUBLICATIONS

User's Guide to RoadNet 5000—Routing & Scheduling System Version 5.6 Roadnet Technologies, Inc., 1996 (Year: 1996).*
(Continued)

*Primary Examiner* — Scott L Jarrett
(74) *Attorney, Agent, or Firm* — Finnegan, Henderson, Farabow, Garrett & Dunner, LLP

(57) ABSTRACT

A system for attendance pre-assignment. The system may include a memory storing instructions and at least processor configured to execute the instructions to perform operations. The operations may include retrieving, from a database, a plurality of delivery routes and a plurality of delivery sub-routes, wherein the delivery sub-routes are part of the delivery routes; calculating, based on the retrieval, a number of packages allocated to the delivery routes and the delivery sub-routes; receive data comprising groups of pre-assigned workers available for deliveries, the workers being classified into a plurality of categories; comparing, based on the received groups, the pre-assigned workers against the delivery routes and the delivery sub-routes; assigning, based on the comparison, the packages, the delivery routes, and the delivery sub-routes to the pre-assigned workers; generating a plurality of candidate routes associated with the pre-assigned workers; and calibrating, based on the assignment and the generated candidate routes, the delivery sub-routes.

20 Claims, 12 Drawing Sheets

(51) Int. Cl.
*G06Q 10/08* (2012.01)
*G06F 16/29* (2019.01)

(58) Field of Classification Search
CPC ............ G06Q 10/0631; G06Q 10/063; G06Q 10/08355; G08G 1/096844
See application file for complete search history.

(56) References Cited

U.S. PATENT DOCUMENTS

| | | | |
|---|---|---|---|
| 5,835,376 | A | 11/1998 | Smith |
| 6,253,129 | B1 | 6/2001 | Jenkins |
| 6,795,823 | B1 | 9/2004 | Aklepi |
| 6,823,315 | B1 | 11/2004 | Bucci |
| 7,222,081 | B1 * | 5/2007 | Sone ................ G06Q 10/08 705/333 |
| 7,313,530 | B2 | 12/2007 | Smith |
| 7,363,126 | B1 | 4/2008 | Zhong |
| 7,587,345 | B2 | 9/2009 | Mann |
| 7,624,024 | B2 | 11/2009 | Levis |
| 7,660,651 | B2 | 2/2010 | Zhong |
| 7,693,653 | B2 | 4/2010 | Hussain |
| 8,051,025 | B2 * | 11/2011 | Wohlganger ........ G06Q 50/28 706/47 |
| 8,131,607 | B2 | 3/2012 | Park |
| 10,133,995 | B1 | 11/2018 | Reiss |
| 10,380,536 | B1 * | 8/2019 | Fornell ............ G06Q 10/1097 |
| 10,467,562 | B1 * | 11/2019 | Mo ................ G06Q 10/06315 |
| 10,467,563 | B1 * | 11/2019 | Mo ................ G06Q 10/08355 |
| 2002/0046073 | A1 | 4/2002 | Indseth |
| 2004/0030572 | A1 | 2/2004 | Campbell |
| 2005/0137933 | A1 | 6/2005 | Holsen |
| 2005/0246192 | A1 | 11/2005 | Jauffred |
| 2006/0167733 | A1 | 7/2006 | Scott |
| 2006/0235739 | A1 | 10/2006 | Levis |
| 2009/0048890 | A1 | 2/2009 | Burgh |
| 2009/0076933 | A1 | 3/2009 | Park |
| 2009/0216600 | A1 | 8/2009 | Hill |
| 2011/0178944 | A1 | 7/2011 | Hirai |
| 2012/0253548 | A1 | 10/2012 | Davidson |
| 2012/0323622 | A1 | 12/2012 | Scott |
| 2013/0030873 | A1 | 1/2013 | Davidson |
| 2013/0096815 | A1 | 4/2013 | Mason |
| 2013/0281133 | A1 | 10/2013 | Davidson |
| 2014/0046585 | A1 | 2/2014 | Morris, IV |
| 2014/0280510 | A1 | 9/2014 | Putnam |
| 2015/0149381 | A1 | 5/2015 | Wada |
| 2015/0161564 | A1 | 6/2015 | Sweeney |
| 2015/0262121 | A1 | 9/2015 | Riel-Dalpe |
| 2016/0117638 | A1 | 4/2016 | Disorbo |
| 2016/0171439 | A1 | 6/2016 | Ladden |
| 2016/0258774 | A1 | 9/2016 | Santilli |
| 2016/0379168 | A1 | 12/2016 | Foerster |
| 2017/0046653 | A1 * | 2/2017 | Wilson ................ G06Q 10/083 |
| 2017/0236088 | A1 | 8/2017 | Rao |
| 2017/0262790 | A1 | 9/2017 | Khasis |
| 2018/0059687 | A1 | 3/2018 | Hayes |
| 2018/0089608 | A1 | 3/2018 | O'Hare |
| 2018/0315319 | A1 | 11/2018 | Spector et al. |

FOREIGN PATENT DOCUMENTS

| | | |
|---|---|---|
| JP | 2013-254255 A | 12/2013 |
| JP | 2016-15769 A | 9/2016 |
| JP | 2017-91509 A | 5/2017 |
| JP | 2018-190253 A | 11/2018 |

OTHER PUBLICATIONS

Haughton, Michael A., The efficacy of exclusive territory assignments to delivery vehicle drivers, European Journal of Operations Research, vol. 184, 2008 (Year: 2008) (15 pages).

Zhong, Houngsheng et al., Territory Planning and Vehicle Dispatching with Driver Learning, Dec. 17, 2004 (Year: 2004) (33 pages).

Smith, Stephen Leslie, Task Allocation and Vehicle Routing in Dynamic Environments, University of California, Sep. 2009 (Year: 2009) (183 pages).

Bent, Russell W. et al., Scenario-Based Planning for Partially Dynamic Vehicle Routing with Stochastic Customers, Operations Research, vol. 52, No. 6, Nov.-Dec. 2004 (Year: 2004) (12 pages).

User's Guide to Roadnet 5000—Routing & Scheduling System Version 5.6, Roadnet Technologies Inc., 1996 (Year: 1996) (735 pages).

Tolvanen, Juha, GIS in Postal Operations, Posti, 2017 (Year: 2017) (20 pages).

Oracle Real-Time Scheduler for Retail Delivery and Logistics, Oracle Data Sheet, Oracle Corporation, 2009 (Year: 2009) (5 pages).

Janssens, Jochen et al., Multi-objective microzone-based vehicle routing for courier companies: from tactical to operational planning, University of Antwerp, Jan. 2014 (Year: 2014) (21 pages).

Lei, Hontago et al., Districting for routing with stochastic customers, European Journal Transportation & Logistics, vol. 1, 2012 (Year: 2012) (19 pages).

Kovacs, Attila et al., Vehicle Routing Problem in Which Consistency Considerations are Important: A Survey, Networks, 2014 (Year: 2014) (22 pages).

Larsen, Allan, The Dynamic Vehicle Routing Problem, IMM, 2000 (Year: 2000) (208 pages).

Carlsson, John G., Dividing territories among several vehicles, University of Minnesota, Oct. 29, 2011 (Year: 2011) (28 pages).

Haugland, Dag et al., Designing delivery districts for the vehicle routing problem with stochastic demands, European Journal of Operational Research, vol. 180, 2007 (Year: 2007) (14 pages).

Descartes.com Web Pages—e-Fulfillment solutions, Descartes, Mar. 2000 (Year: 2000) (9 pages).

Cao, Viet-Cuong, Design a mobile logistics solution utilising modern software and services, Hochshule Darmstadt University of Applied Sciences, Aug. 13, 2012 (Year: 2012) (67 pages).

Kant, Goos et al., Coca-Cola Enterprises Optimizes Vehicle Routes for Efficient Product Delivery Interfaces, vol. 38, No. 1, Jan-Feb. 2008 (Year: 2008) (11 pages).

Haughton, Michael A., Assigning delivery routes to drivers under variable customer demand Transportation Research Part E, 2007 (Year: 2007) (16 pages).

Written Opinion of the International Searching Authority for Application PCT/IB2020/051154, dated May 25, 2020, (8 pages).

International Search Report for Application PCT/IB2020/051154, dated May 25, 2020, (4 pages).

Japanese Office Action and translation in counterpart Application No. 2020-537689 dated Apr. 27, 2021 (11 pages).

* cited by examiner

Favorites Application          login   Sign Up   Service center

`all`

My Account   Shopping Cart

Shipments   Fast Shipments   Christmas   Gold deals   Regular delivery   Events / Coupons   Planned Exhibition   Gift Cards Home > Food > Daily products / ice cream > Cheese > Fresh cheese > Mozzarella mozzarella cheese

285 Reviews    20,000 won

FREE Shipping

Tomorrow (Wed) 11/28 Arrival Guarantee

Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and | Content reference | nutrient | None |

FIG. 1C

11/28/2018          Shopping Cart

| General Purchasing (1) | Periodic Delivery (0) |

☑ Select All      Product Information      Item Amount   shipping fee

Rocket shipping products  free shipping

☑   Mozzarella cheese, 1kg, 2 pieces
Tomorrow (Thursday) 11/29
Arrival guarantee (order before 12 pm)

20,510 won    [1▼]   free

| Even if you add other rocket shipping products, free shipping available | shipping Free   Order amount
$20.00

☑ Select All (1/1)   [Delete all]   [sold out / discontinued products clear all]   [interest payment]

$__.00

[Continue shopping]   [Buy now]

Customers who bought this product also purchased

1/5

Rosé spaghetti sauce,    Napoli Chunky Tomato    Grated Parmesan    Bacon and Mushroom Cream
600g, 2 pieces            Pasta Sauce,                cheese,                Pasta Sauce,
6,500 won               3,800 won               6,460 won            4,870 won
(54 won per 10g)        (86 won per 10g)        (285 won per 10g)     (108 won per 10g)

| | | | 8:09 |
|---|---|---|---|
| ☰ Number/Type/Workers | | 🔍 💬 ⋮ | |
| In Process 150 orders | Complete 75 orders | Incomplete 10 orders | Refusal of Receipt 2 orders |

Classification 628

[Flex Worker 608]   John Smith 602         [N/A] | ☰ | ✉
  31-34 Myeong-dong, Jung-gu, Seoul      [Route Delivery 614]
▷ Building 305, Apt. 105
[PM] 193(D) | B1 | 8/7 Date (1 day) | undesignated time (unknown time)

[Half-Day 610]   Tim Thompson 604        [In person ⓘ] | ☰ | ✉
  192-37 Euljiro-1-ga, Jung-gu, Seoul    [Sub-route Delivery 616]
▷ Building 5, Apt. 2280
194(D) | A2 | 8/7 Date (1 day) | undesignated time (unknown time)

[Walk-Man 612]   Richard Johnson 606              ☰ | ✉
  81-3 Sejongno, Jongno-gu, Seoul
[PM]                                          ⓘ

Camp Leader Request entered.

PACKAGE DELIVERY SUB-ROUTE ASSIGNMENTS TO DELIVERY WORKERS BASED ON EXPECTED DELIVERY EFFICIENCY

CROSS-REFERENCE TO RELATED APPLICATIONS

This application is a continuation of and claims the benefit of priority to U.S. application Ser. No. 16/278,709, filed Feb. 18, 2019 (now allowed), the contents of which are hereby incorporated herein by reference.

TECHNICAL FIELD

The present disclosure generally relates to computerized systems and methods for pre-assigning delivery workers and managing delivery routes to optimize delivery. In particular, embodiments of the present disclosure generally relate to inventive and unconventional systems for dynamically separating delivery areas into regions based on an available package distribution and available delivery men resources, and for pre-assigning available packages, routes, and sub-routes to delivery workers.

BACKGROUND

Numerous computerized inventory management systems and delivery centers exist. These systems and centers are designed to enable efficient distribution of goods in an established delivery area and to utilize available resources for delivering these goods to consumers, for example, at local shipping centers. Traditionally, each delivery center may divide its established delivery area into separate regions or sub-regions, and then these systems may direct delivery workers to deliver the goods to one or more of the regions or sub-regions.

Typically, however, each of these regions are fixed in nature, and each region is only covered by a single delivery worker, who may be unable to keep up with a regions' delivery demands. Further, conventional systems are unable to dynamically alter region boundaries in real-time or adjust regional assignment of delivery workers. Moreover, conventional systems are often not able to flexibly cope with a dynamic or changing delivery volume. Nor are they equipped to analyze a delivery vehicle's load limit or consider a delivery worker's delivery efficiency or skill.

Even further, prior systems for loading trucks with packages and selecting sub-routes that a delivery driver will follow are generally manual and rely on the experience of drivers. It can take regularly driving the same route for 3-5 years for a delivery worker to become efficient at loading a delivery truck and driving from place to place quickly. Routes and sub-routes are generally static and do not change from day to day. If one route has many packages, the driver assigned to that particular route may be overburdened while another driver may be underutilized and current computerized systems cannot account for these problems. Additionally, the task of sorting packages in a delivery truck by a delivery driver may be time consuming.

Therefore, what is needed is a system that is capable of dynamically assigning delivery workers and dynamically calibrating delivery areas into regions, routes, and sub-routes for optimizing delivery in real-time and by pre-assignment of delivery workers. Further, what is needed is a digital delivery solution that can quickly and flexibly handle unpredictable changes in delivery conditions based on changes in daily package distribution and available delivery men resources. Finally, what is needed are improved methods and systems for facilitating a dynamic delivery quantity, increasing a loading capacity for transportation vehicles, increasing delivery efficiency and available working hours for each delivery worker, and monitoring, pre-assigning, and updating in real-time environmental characteristics and features specific to each delivery region.

SUMMARY

One aspect of the present disclosure is directed to a system for pre-assigned workers. The system may include a memory and a processor configured to execute instructions to perform operations. The operations may include retrieving, from a database, a plurality of delivery routes and a plurality of delivery sub-routes, wherein the delivery sub-routes are part of the delivery routes; calculating, based on the retrieval, a number of packages allocated to the delivery routes and the delivery sub-routes; receiving data comprising groups of pre-assigned workers available for deliveries, the workers being classified into a plurality of categories; comparing, based on the received groups, the pre-assigned workers against the delivery routes and the delivery sub-routes; assigning, based on the comparison, the packages, the delivery routes, and the delivery sub-routes to the pre-assigned workers; generating a plurality of candidate routes associated with the pre-assigned workers; and calibrating, based on the assignment and the generated candidate routes, the delivery sub-routes.

Another aspect of the present disclosure is directed to a method for pre-assignment. The method may perform operations including retrieving, from a database, a plurality of delivery routes and a plurality of delivery sub-routes, wherein the delivery sub-routes are part of the delivery routes; calculating, based on the retrieval, a number of packages allocated to the delivery routes and the delivery sub-routes; receiving data comprising groups of pre-assigned workers available for deliveries, the workers being classified into a plurality of categories; comparing, based on the received groups, the pre-assigned workers against the delivery routes and the delivery sub-routes; assigning, based on the comparison, the packages, the delivery routes, and the delivery sub-routes to the pre-assigned workers; generating a plurality of candidate routes associated with the pre-assigned workers; and calibrating, based on the assignment and the generated candidate routes, the delivery sub-routes.

Yet another aspect of the present disclosure is directed to a delivery system. The delivery system may include a database comprising geographical data and historical delivery data, the geographical data being stored in pre-defined regions and sub-regions. The delivery system may include an expected delivery efficiency generator implemented in software or hardware, configured to receive geographical data from a plurality of the pre-defined regions and a plurality of the sub-regions, wherein the geographical data includes at least one of landscape data, business data, residential data, parking data, or building data; determine, based on the geographical data, an expected delivery efficiency, the expected delivery efficiency being measured by percentiles of addresses visited by the workers per hour (APH); and calculate, based on the historical delivery data, the APH for selected individual pre-defined regions and sub-regions. The system may include a cross time generator implemented in software or hardware, configured to: calculate an expected time for the workers to travel between first and second regions, wherein the expected time includes a cross-region time and a sub-region time based on a median time gap or an average time; and determine, based on a linear regression and the cross-region time, a driving time between the first and the second regions. The system may further include a route generator implemented in software or hardware, configured to: receive data comprising groups of pre-assigned workers available for deliveries, the workers being classified into a plurality of categories; compare, based on the received groups, the pre-assigned workers against delivery routes and delivery sub-routes, wherein the delivery sub-routes are part of the delivery routes; assign, based on the comparison, packages, the delivery routes, and the delivery sub-routes to the pre-assigned workers; generate a plurality of candidate routes associated with the pre-assigned workers; and calibrate, based on the assignment and the generated candidate routes, the delivery sub-routes. Other systems, methods, and computer-readable media are also discussed herein.

BRIEF DESCRIPTION OF THE DRAWINGS

FIG. 1C depicts a sample Single Display Page (SDP) that includes a product and information about the product along with interactive user interface elements, consistent with the disclosed embodiments.

FIG. 1D depicts a sample Cart page that includes items in a virtual shopping cart along with interactive user interface elements, consistent with the disclosed embodiments.

FIG. 6 is a diagrammatic illustration of a system visual representation of a graphical user interface (GUI) for use by a delivery administrator, consistent with the disclosed embodiments.

DETAILED DESCRIPTION

Figure 1A:
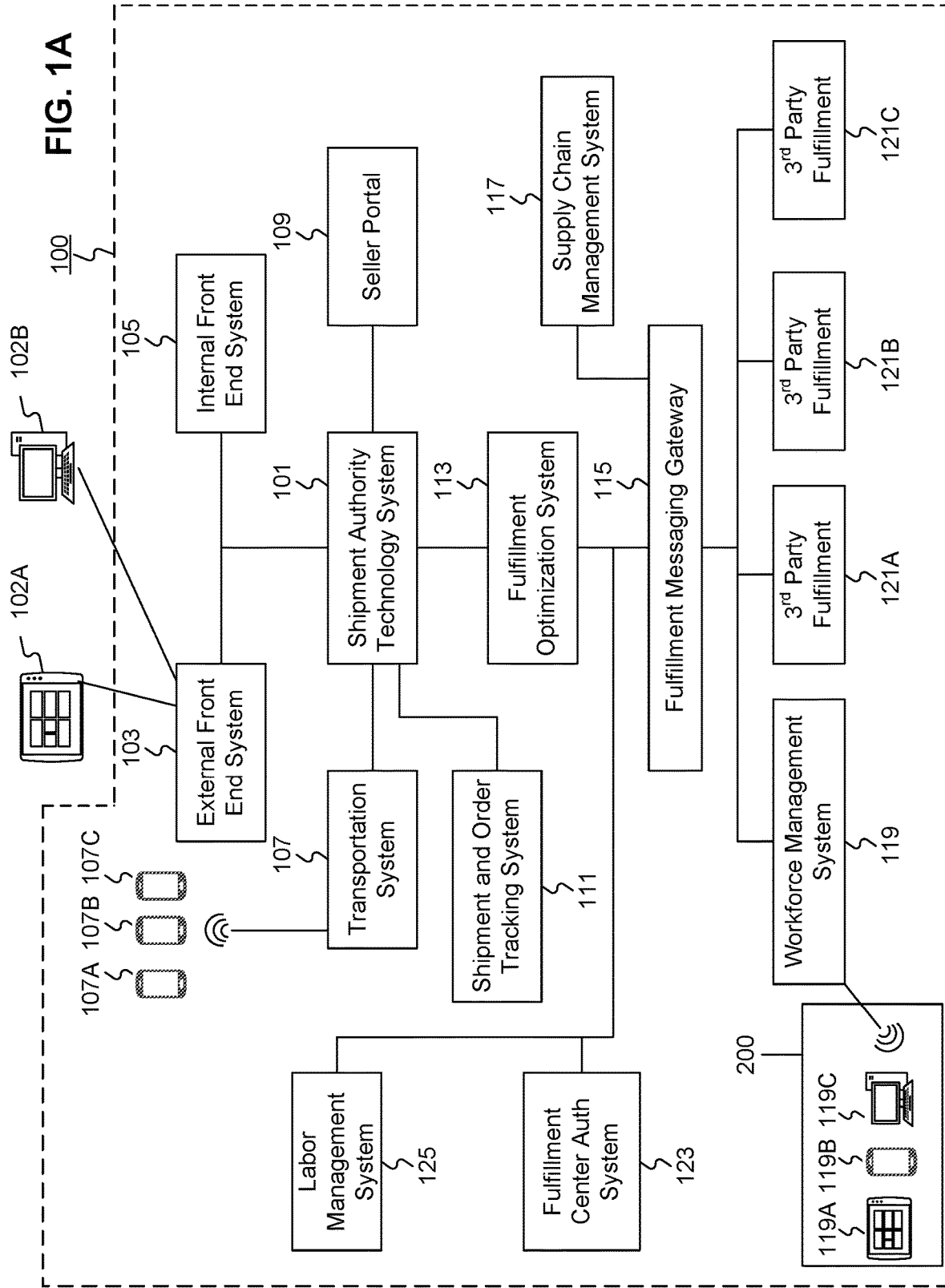
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for pre-assigning delivery workers and managing delivery routes to dynamically optimize delivery.

Referring to FIG. 1A, a schematic block diagram 100 illustrating an exemplary embodiment of a network comprising computerized systems for communications enabling shipping, transportation, and logistics operations is shown. As illustrated in FIG. 1A, system 100 may include a variety of systems, each of which may be connected to one another via one or more networks. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in network 100. For example, in embodiments where network 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (not depicted), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in network 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in network 100. For example, external front end system 103 may request results from FO System 113 that satisfy the search request. External front end system 103 may also request and receive (from FO System 113) a Promised Delivery Date or "POD" for each product returned in the search results. The PDD, in some embodiments, represents an estimate of when a package will arrive at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may deliver the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in network 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases network 100) to interact with one or more systems in network 100. For example, in embodiments where network 101 enables the presentation of systems to enable users to place an order for an item, internal front end system 105 may be implemented as a web server that enables users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from devices depicted in network 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between devices in network 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature. The mobile device may send a communication to transportation system 107 including information about the delivery, including, for example, time, date, GPS location, photo(s), an identifier associated with the delivery worker, an identifier associated with the mobile device, or the like. Transportation system 107 may store this data in a database (not pictured) for access by other systems in network 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store a relationship between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this relationship in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other outside entities to electronically communicate with other aspects of information relating to orders. For example, a seller may utilize a computer system (not pictured) to upload or provide product information, order information, contact information, or the like, for products that the seller wishes to sell through system 100.

Shipment and order tracking system 111, in some embodiments, may be implemented as a computer system that receives, stores, and forwards information regarding the location of packages ordered by customers (e.g., by a user using devices 102A-102B). In some embodiments, shipment and order tracking system 111 may request or store information from web servers (not pictured) operated by shipping companies that deliver packages ordered by customers.

In some embodiments, shipment and order tracking system 111 may request and store information from systems depicted in network 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual packages inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, some items that customers order may be stored only in one fulfillment center, while other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives communications from one or more systems in network 100, such as FO system 113, converts the data in the communications to another format, and forward the data in the converted format to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may determine forecasted level of demand for a particular product based on, for example, based on a past demand for products, an expected demand for a product, a network-wide past demand, a network-wide expected demand, a count products stored in each fulfillment center 200, expected or current orders for each product, or the like. In response to this determined forecasted level and the amount of each product across all fulfillment centers, SCM system 117 may generate one or more purchase orders to satisfy the expected demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with network 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with network 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly.

Fulfillment Center Auth system (FC Auth) 123, in some embodiments, may be implemented as a computer system with a variety of functions. For example, in some embodiments, FC Auth 123 may act as a single-sign on (SSO) service for one or more other systems in network 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113 through FMG 115, not all embodiments require this particular configuration. Indeed, in some embodiments, the systems in network 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in network 100 may be implemented as one or more virtual servers implemented at a data center, server farm, or the like.

Figure 2:
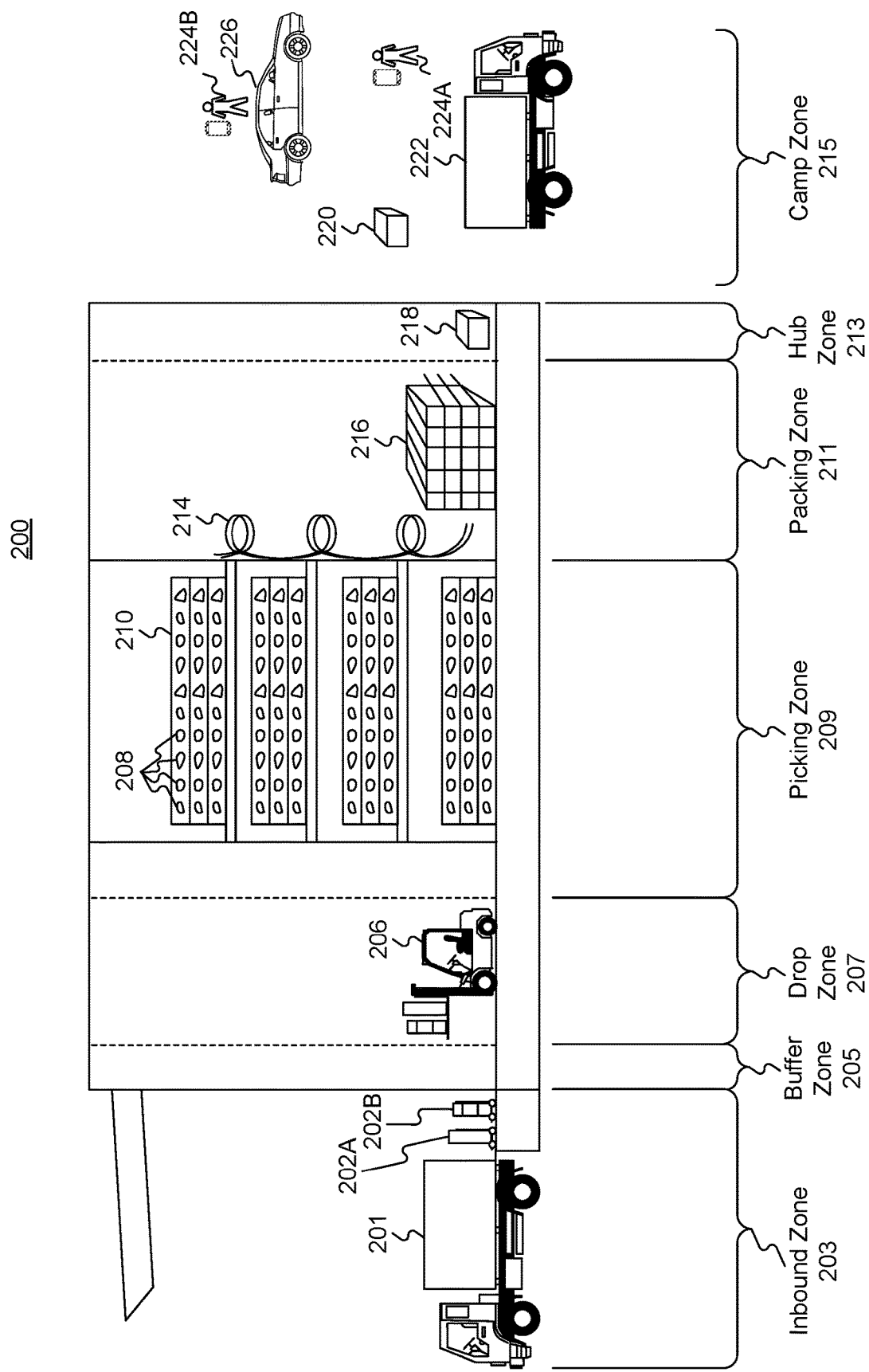
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using network 100 from FIG. 1. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1 indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
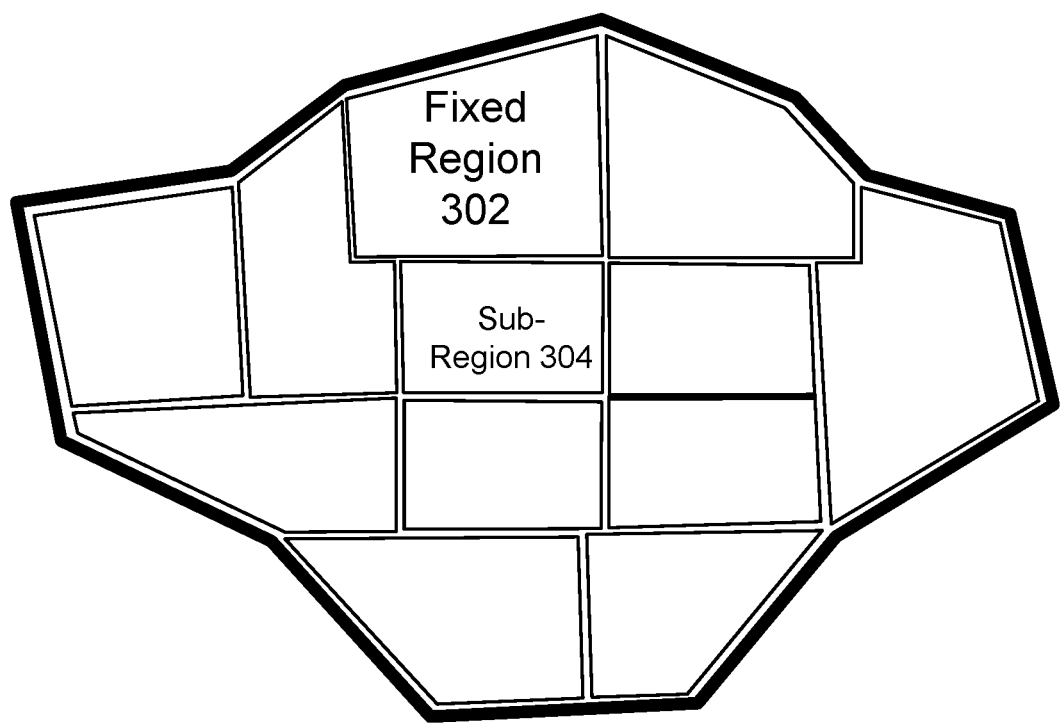
FIG. 3 is a diagrammatic illustration of prior art identifying a conventional shipping area including separated fixed delivery regions, each of which assigned to an individual delivery worker.

FIG. 3 is a diagrammatic illustration of a conventional shipping area including segmented fixed delivery regions, each of which is assigned an individual delivery worker to make deliveries. As shown in FIG. 3, a geographical area such as a town, municipality, district, county, or state may be segmented into multiple regions of varying dimensions including fixed region 302 and sub-region 304, and each region or sub-region may include a fixed boundary. The geographical area may further be divided into sub-regions, and delivery workers 224A, 224B may deliver goods to one or more of the regions or sub-regions according to the fixed geographical boundaries. Conventionally, each region or sub-region in FIG. 3 is assigned no more than a single delivery worker to make deliveries to the region or sub-region.

Figure 4:
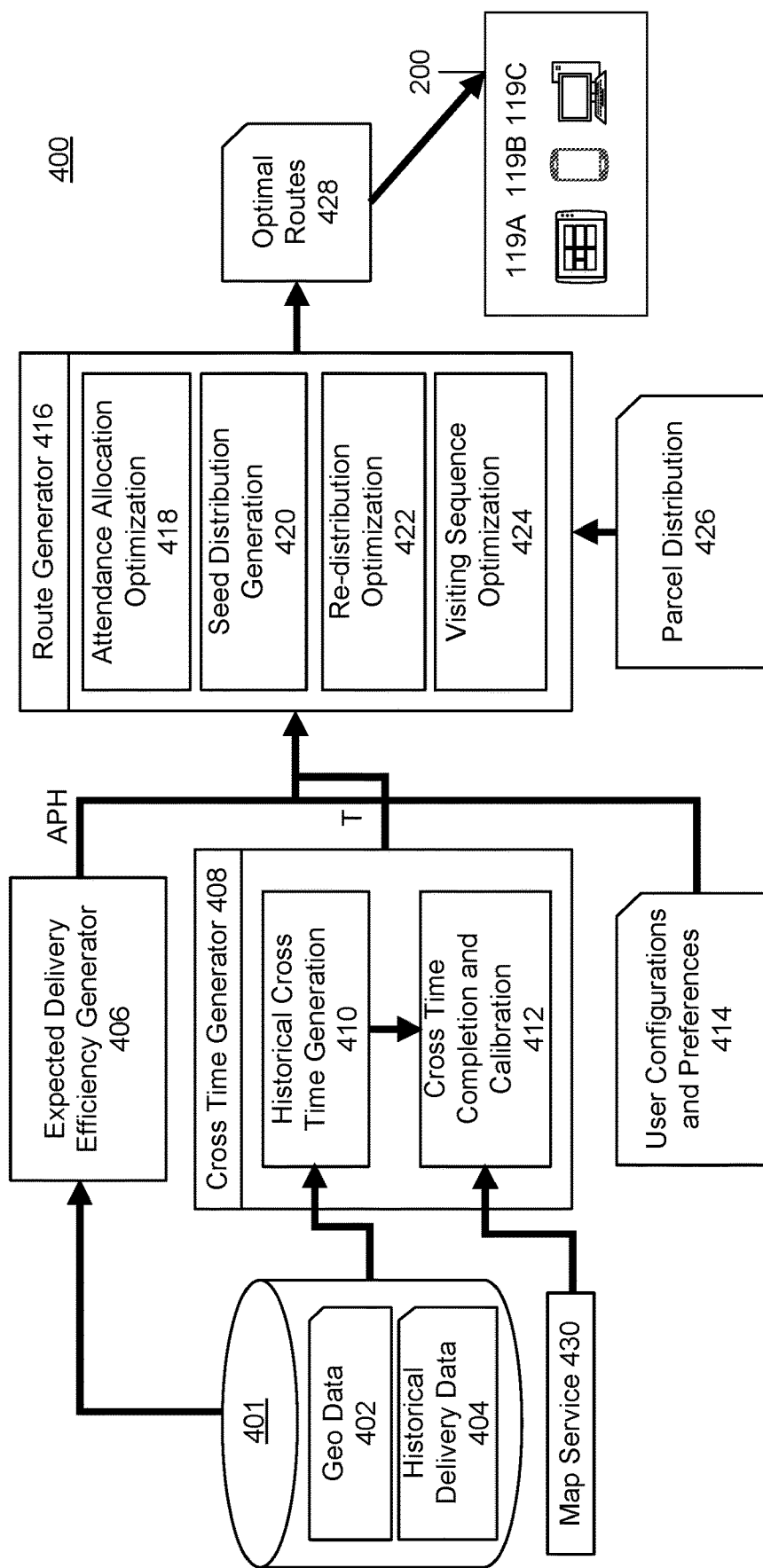
FIG. 4 is a diagrammatic illustration of delivery modules including an expected delivery efficiency generator, cross-time generator, and route generator used by the systems and methods described herein, consistent with the disclosed embodiments.

FIG. 4 is a diagrammatic illustration 400 of delivery modules including an expected delivery efficiency generator 406, cross-time generator 408, and route generator 416 used by the systems and methods described herein, consistent with the disclosed embodiments and implemented in software or hardware.

As shown in FIG. 4, a database 401 includes geodata 402 and historical delivery data 404. Geodata 402 may include geographical information including pre-defined regions and sub-regions. Sub-regions may exist as a smaller portion of a singular pre-defined region. A plurality of sub-regions may also exist within a singular region, and sub-regions may constitute areas that possess the same geographical characteristics. In some aspects, sub-regions may not be further divisible. As an example, a pre-defined region may include a county, state, or zip-code. As a further example, a sub-region may include a town, municipality, city, or other location. Regions and sub-regions are not limited to the foregoing examples. Indeed, a sub-region may exist as a county, or a region may exist as a town. Other geographical examples for regions and sub-regions may be contemplated and may be accessible from a database. Historical delivery data 404 may include data including a delivery location, delivery time, delivery driver, and/or a delivery package. Other types of historical are possible as well.

Expected delivery efficiency generator 406 may communicate with a database and may retrieve each of geodata 402 and historical delivery data 404 to determine an expected delivery efficiency in each region or sub-region. As an example, expected delivery efficiency generator 406 may further rely on one or more of a landscape, business area, residential area, parking area, or building description to determine an expected delivery efficiency. Expected delivery efficiency generator 406 may incorporate each of geodata, historical data, and landscape or business data and compare against stored address data to calculate an expected delivery efficiency. The comparison may evaluate a total number of deliveries or individual deliveries made to a particular address over a filtered time period, and based on geodata, historical data, and landscape or business data, calculate an efficiency value (such as the number of Addresses per Hour (APH)) using delivery time(s), distance (s), or other criteria or metrics. Expected delivery efficiency generator 406 may calculate a relative efficiency value in addition to an absolute efficiency as the expected delivery efficiency. A relative efficiency value may include percentage values (e.g. 60% or 70%, also known as P60 or P70) based on different delivery landscapes or regions. An absolute efficiency value may include absolute values (e.g. 18 packages/hour or 20 packages/hour). Since regions or landscapes may have different delivery geographies, a relative efficiency value may be preferred over an absolute value efficiency value. Further, expected delivery efficiency generator 406 may calculate an APH metric, which may represent a number of addresses that can be visited by a delivery worker within a single hour or other time period, and this metric may include a value relative to other calculated APH values or may represent an absolute value. Percentile values of APH in each region and sub-region may be calculated based on historical data. In some aspects, a specific percentile may be determined as an expected delivery efficiency (e.g. $60^{th}$ percentile or P60 as a relative efficiency value). In other aspects, an expected delivery efficiency may factor in time for delivery and the skill or experience of a delivery worker.

Consistent with this disclosure, expected delivery efficiency generator 406 may generate percentiles for region and sub-regions based on three months of historical data or less. Other time ranges for using historical data are possible as well. Reliance on historical data may be filtered by a filter or inputted search terms according to any desired features including, for example, "valid" delivery periods. A "valid" delivery period may require that all delivery periods be completed by the same delivery worker in the same sub-region on the same day. In some aspects, a "valid" delivery period may require that the period be greater than or equal to 15 minutes. In other aspects, a "valid" delivery period may also require that a time gap between any two consecutive deliveries as less than 30 minutes. Other criteria for "valid" time periods may be contemplated and used for filtering. Expected delivery efficiency generator 406 may calculate an APH value for each "valid" delivery period and may also generate percentile values of APH for each "valid" delivery period. Other metrics to determine delivery efficiency may be contemplated and utilized by expected delivery efficiency generator 406.

Figure 5:
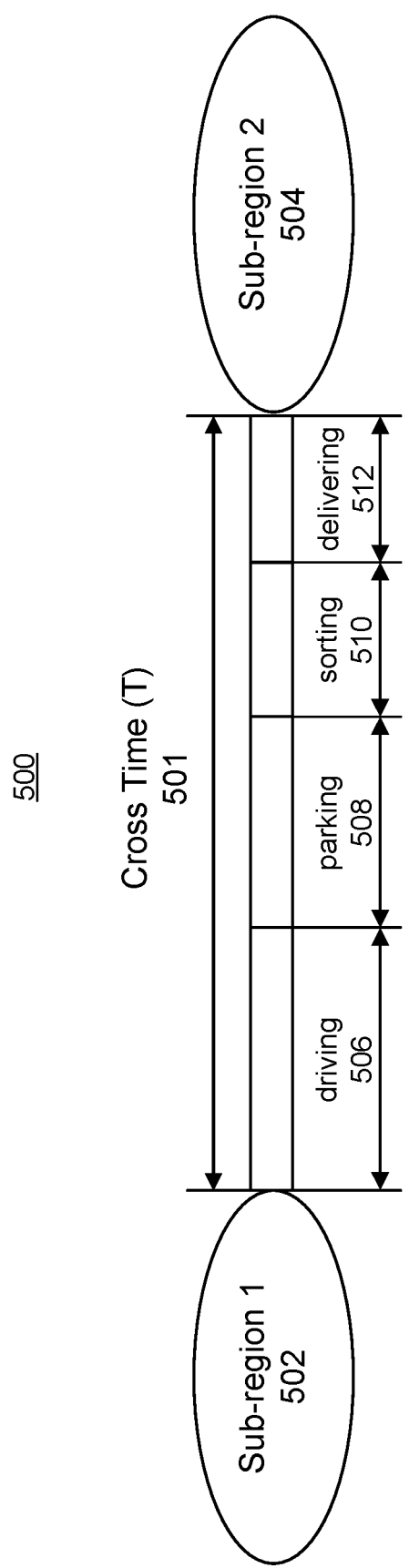
FIG. 5 is a diagrammatic illustration of a representation of cross-time data stored in a data structure determined by a cross-time generator, consistent with the disclosed embodiments.

FIG. 5 is a diagrammatic illustration of a representation of cross-time data stored in a data structure 500 used by cross-time generator 408, consistent with the disclosed embodiments to calculate a cross time (T) 501. As shown in FIG. 5, cross-time generator 408 includes two regions identified as "sub-region 1" 502 and "sub-region 2" 504. For each of the two sub-regions, a linear spectrum includes temporal portions dedicated to each of "driving" 506, "parking" 508, "sorting" 510, and "delivering" 512, all tasks to be performed by a delivery worker. These cross-times may be calculated to determine the amount of time it takes a delivery worker to complete any of the aforementioned tasks, including, for example, each of "driving" 506, "parking" 508, "sorting" 510, and "delivering" 512, between two sub-regions 502, 504. However, cross-time generator 408 does not necessarily need to calculate times solely for "driving" 506 and may perform calculations for other modes of transportation in addition to "driving" 506. For instance, cross-time generator 408 may include additional steps or exclude any of the aforementioned steps. Cross-time generator 408 may implement historical cross time generation module 410 to generate a historical cross-time measurement and cross time completion and calibration module 412 to calculate a cross-time completion and calibration measurement 412. A cross region/sub-region time may be calculated to be the expected time for a delivery worker to travel from one region to the next region, or from one sub-region to the next sub-region, as shown in FIG. 5.

Going back to FIG. 4, cross-time generator 408 may further calculate a cross region/sub-region time by using the median time gap between two regions or sub-regions in the last three months. This time may include the delivery time of one order and may not exclusively include a crossing time. Where there is not a time gap or the number of data samples is not greater than two, cross-time generator 408 may use the average cross region/sub-region time in a camp or camp zone 215. Cross-time generator 408 may also perform cross time completion and calibration. As an example, where there are "n" regions or sub-regions, a total number of cross lime may be $n^2/2$. Typically, the historical cross time may be much less than this value, as delivery men may be unlikely to cover all cross possibilities. As shown in FIG. 4, a map service module 430 may be used to determine the driving time between any two regions/sub-regions. Linear regression may also be used to determine the relationship between a driving time and cross time, so that the driving time obtained from map service module 430 may be converted to cross time and a cross time matrix may be completed. Consistent with this disclosure, a cross-time matrix may be used to calculate a cross time.

Consistent with this disclosure, route generator 416 may include an attendance allocation optimization module 418, seed distribution generation module 420, re-distribution optimization module 422, and a visiting sequence optimization module 424. As shown in FIG. 4, route generator 416 may source APH values from expected delivery efficiency generator 406, time (T) values, package distributions 426 and user configurations and preferences 414 in order to generate routes 428. Attendance allocation optimization module 418 may be used to allocate a number of delivery men to each group based on the following inputs: package distribution 426, and an attendance number assigned under a classification category (e.g. "newbie," "normal," "senior") relating to delivery worker experience. As part of these classification categories, delivery workers may be associated with varying weights that may account for their delivery abilities and/or deliver efficiencies. Weights may also relate to delivery workers delivery experiences. For example, "newbie" classification indicates a brand-new delivery worker or a delivery worker with little or no delivery experience. "Normal" classification indicates a delivery worker with some by not a lot or significant delivery experience. "Senior" classification indicates a delivery worker with many years of significant delivery experience. Other classification identifications may be possible as well. Seed distribution generation module 420 may be used to delete excessive regions, create new regions, and generate regions based on rules configured by users. These rules may be configured by users to delete excessive regions and create new regions, and rules may be entered into an interface and further specify a desired delivery worker (e.g. "low-top," "workman-preferred," and "other rules"). "Low-top" classification indicates a delivery worker who has experience loading deliveries in vehicles with lower tops, as opposed to large trucks. Vehicles with lower tops including low top trucks may be required to make deliveries to addresses that require delivery to a basement. Seed distribution generation module 420 may generate operation rules which may be region specific and may require all deliveries made in a particular region to be "low-top" or "workman-preferred." "Workman-preferred" classification indicates a delivery worker who possess all sorts of handyman or loading skills, and who can perform all different types of tasks with varied complexity. Seed distribution generation module 420 may require certain regions to include only "workman-preferred" delivery workers. "Other rules" classification indicates "other rules" that may be specified based on a specific delivery requirement at hand. Other classification identifications may be possible as well.

Re-distribution optimization module 422 may be based on regions within a generated seed distribution and may create a plurality of candidate regions. Re-distribution optimization module 422 may further implement a 0/1 programming model to determine an optimal combination of regions from all of the candidate regions in order to cover all delivery demand and minimize delivery cost. Visiting sequence optimization module 424 may utilize the output of re-distribution optimization 422 that is a collection of newly generated regions. Within each generated region, visiting sequence optimization module 424 may determine the best delivery visiting sequence in order to minimize delivery cost. Visiting sequence optimization module 424 may provide coding to describe regions and subregions, and delivery to particular regions and subregions in a particular order. Letters or numbers may be used as code to describe regions or subregions, and to present a visiting delivery sequence in order to minimize delivery cost. Attendance allocation optimization module 418, seed distribution generation module 420, re-distribution optimization module 422, and a visiting sequence optimization module 424 may work together to generate optimal routes 428.

Consistent with this disclosure, attendance allocation optimization module 422 may implement the following equations in order to allocate workers (the "Integer programming model"):

$$\min \sum_{i \in G} \left| avg - \frac{\mathcal{P}_i}{\mathcal{W}_i} \right| + \sum_{i \in G} d_i(u_i + v_i),$$

where $$\mathcal{W}_i = \alpha(a_i + x_i) + \beta(b_i + y_i) + \gamma(c_i + z_i), \forall i \in G$$

$$\frac{\mathcal{P}_i}{\mathcal{W}_i} + u_i \geq \lambda * avg, \forall i \in G$$

$$\frac{\mathcal{P}_i}{\mathcal{W}_i} - v_i \geq \delta * avg, \forall i \in G$$

$$\sum_{i \in G} x_i = c,$$

$$\sum_{i \in G} y_i = h$$

$$\sum_{i \in G} z_i = w$$

$$x_i + y_i \geq f_i, \forall i \in G$$

$$y_i \leq \frac{h}{|G|} + 1, \forall i \in G$$

$$z_i \leq x_i, \forall i \in G$$

$$x_i, y_i, z_i \geq 0$$

Each of these variables are explained below. $x_i$, $y_i$, $z_i$ may represent integer variables describing how many deliver workers, half-day workers, and walk-men may be assigned to group i, respectively. Other parameters used by the integer programming model may include avg, which represents the average parcels per driver (PPD) for a whole camp, $p_i$, a total number of packages in group i, $W_i$, a total number of weighted workers in group i, $d_i$, a variance penalty from the given bound of PPD, $u_i$, a variance below a lower bound, $v_i$, a variance beyond an upper bound, $\alpha$, $\beta$, and $\gamma$, respective weights for delivery workers, half-day, and walk-men workers, $a_i$, $b_i$, and $c_i$, a number of delivery workers, half-day, and walk-men that has been pre-assigned to group i, respectively, $\lambda$, $\delta$, lower and upper bound ratios, c, h, and w, total numbers of delivery workers, half-day workers, and walk men that need to be assigned, respectively, and $f_i$, a number of routes that cannot be removed from assignment. G may also represent the available set of groups.

The objective of the attendance allocation optimization module 422 integer programming model is to minimize the difference between each camp's average PDD and each group's average PPD and minimize the variance from the given thresholds.

The integer programming model used by attendance allocation optimization module 422 may also include additional constraints. For example, attendance allocation optimization module 422 may calculate the a weighted value of all delivery workers as $w_i = \alpha(a_i + x_i) + \beta(b_i + y_i) + \gamma(c_i + z_i)$. Attendance allocation optimization module 422 may also verify, by calculation, that the group level average PPD should be between, or within, the lower and upper thresholds:

$$\frac{p_i}{w_i} + u_i \geq \lambda * avg \quad \forall i \in G$$

$$\frac{p_i}{w_i} - v_i \leq \delta * avg \quad \forall i \in G$$

Attendance allocation optimization module 422 may also verify, by calculation, that the total number of different attendances assigned to each group equals the number of attendances for the same type. Attendance allocation optimization module 422 may also set a reasonable upper bound for each type of worker, such as ensuring, by calculation, that the total number of delivery workers assigned to each group should equal to the number of delivery workers ($\Sigma_{i \in G} x_i = c$), ensuring, by calculation, that the total number of half-day workers assigned to each group should equal to the number of half-day workers ($\Sigma_{i \in G} y_j = h$), and ensuring, by calculation, that that the total number of walk-men assigned to each group should equal to the number of walk-men.

Attendance allocation optimization module 422 may also ensure, by calculation, that the number of delivery workers is not less than the number of routes that cannot be removed ($x_i \geq f_i$, $\forall i \in G$), ensuring, by calculation that not too many half-day workers are assigned to the same group $$\left( y_i \leq \frac{h}{|G|} + 1, \forall i \in G \right),$$

and ensuring, by calculation, that each delivery worker takes at most one walk-man along for a delivery ($z_i \leq x_i$, $\forall i \in G$).

Consistent with this disclosure, redistribution optimization module 422 may implement the following equations in order to redistribute workers optimally (the "0/1 programming model"):

$$\min \sum_{i \in I} c_i x_i + \sum_{j \in J} c_j y_j + \sum_{k \in K} c_k z_k + \sum_{l \in L} c_l u_l$$

$$\sum_{i \in I} x_i = c$$

$$\sum_{j \in J} y_j = w$$

$$\sum_{k \in K} z_k = n$$

$$\sum_{l \in L} u_l = h$$

$$\sum_{i \in I} a_{is} x_i + \sum_{j \in J} a_{js} y_j + \sum_{k \in K} a_{ks} z_k + \sum_{l \in L} a_{ls} u_l = 1, \forall_s \in S$$

$$x_i, y_j, z_k, u_l \in \{0, 1\}$$

The 0/1 programming model here may be understood as a minimization problem. Each of the above variables are explained below. $x_i$, $y_j$, $z_k$, $u_l$ may represent binary variables relating to route selection. For example, if route i is selected the value of $x_i$ is 1 and is 0 otherwise. I may represent a set of normal routes as delivery worker routes, J may represent a set of walk-man companion routes as walk-men routes, K may represent a set of new created routes as new routes, and L may represent a set of half-day routes. S may represent a set of sub-routes. c, w, n, and h may represent counts of routes for delivery workers, walk-men, new-route, and half-day workers, respectively. Finally, $a_{is}$, $a_{js}$, $a_{ks}$, and $a_{ls}$ may describe indicator variables; if sub-route s is in one of routes i, j, k, l, then corresponding indicator value is 1 (and is otherwise 0).

One objective of the 0/1 programming model in redistribution optimization module 422 is to minimize the penalty of invalidation of the evaluation metrics. Redistribution optimization module 422 may calculate a penalty cost for each route, based on one or more of a penalty of deviation from the normalized PPD, penalty of multi-parent routes, penalty of crossing time between sub-routes from different parent routes, penalty of exchange route, and penalty of move difficulty.

Redistribution optimization module 422 may impose different constraints. For example, redistribution optimization module 422 may impose "count constraints," including by calculating that the number of generated routes equals the number of attendances for the same type. For example, redistribution optimization module 422 may ensure, by calculation, that the number of delivery routes equals the number of delivery workers ($\Sigma_{i \in I} x_i = c$), may ensure, by calculation that the number of walk-man routes equals the number of walk-men ($\Sigma_{j \in J} y_j = w$), may ensure, by calculation, that the number of new-routes equals the number of new created routes required ($\Sigma_{k \in K} z_k = n$), and may ensure, by calculation, that the number of half-day routes equals the number of half-day worker or newbies ($\Sigma_{l \in L} u_l = h$).

Second, redistribution optimization module 422 may impose "cover constraints" for example, to ensure by calculation that each sub-route is covered once and only once ($\Sigma_{i \in I} a_{is} x_i + \Sigma_{j \in J} a_{js} y_j + \Sigma_{k \in K} a_{ks} z_k + \Sigma_{l \in L} a_{ls} u_l = 1$, $\forall s \in S$).

FIG. 6 is a diagrammatic illustration of a system visual representation of a graphical user interface (GUI) 600 for use by a camp zone 215 leader, consistent with the disclosed embodiments. A camp zone 215 leader may enter information relating to the number and type of workers available for a particular day's deliveries. Each worker may be classified as a normal delivery worker, a half-day worker, walk-man, newbie or senior delivery worker. Each of these titles may correlated to a different delivery experience or skill level. "Newbie" classification indicates a brand new delivery worker or a delivery worker with little or no delivery experience. "Half-day" classification indicates a delivery worker that is a "flex worker" and may only work a half-day. A "flex worker" is a worker that has a flexible schedule and that can work both full and half-days. A "flex worker" may refer to a worker that works different times during the day, works for different durations each day, or works on any other type of flexible schedule. Typically, "Half-day" workers may operate a sub-route as opposed to a full delivery route, all though both route types are contemplated for "half-day" workers. "Walk-man" indicates a classification of a delivery worker who is able to walk large distances to hand-deliver a package. Delivery workers of the "Walk-man" classification may use trucks to deliver packages and may depart from the truck with the truck driver to drop off and deliver packages. "Senior" classification indicates a delivery worker with many years of significant delivery experience. Other classification identifications may be possible as well. Each type of worker may also be weighted differently based on efficiencies associated with their classification. As shown in FIG. 6, an exemplary system visual representation of a GUI 600 includes a toolbar for entering a number and type of workers to see the workers available for the day's deliveries.

As shown in FIG. 6, returned toolbar search results may include "John Smith" 602, "Tim Thompson" 604, and "Richard Johnson" 606 as available delivery workers. "John Smith" is classified as a "Flex Worker" 608, "Tim Thompson" is classified as "Half-Day" worker 610, and "Richard Johnson" is classified as a "Walk-Man" 612. Addresses are also listed adjacent to each delivery worker to indicate a proximity to available delivery regions, routes, and sub-routes. As an example, "John Smith" is located at "31-34 Myeong-dong, Jung-gu, Seoul Building 305, Apt. 105." As shown in FIG. 6, "John Smith" 602 is assigned to "route delivery" 614, and "Tim Thompson" 604 is assigned to "sub-route delivery" 616. As discussed above, "Half-day" workers may deliver packages along one or more sub-routes (as opposed to a full route), although both route types are contemplated for "half-day" workers. Therefore, as shown in FIG. 6, "John Smith" 602 performs a full "route delivery" 614 while "Tim Thompson 604" performs a flex "sub-route delivery" 616, which may or may not include a portion of the route "John Smith" 602 is assigned to.

Further, as shown in FIG. 6, other graphical interface components are included which allow for a camp zone 215 leader to view classifications, schedules, weights, efficiencies, and other features associated with each delivery worker. For example, status bar 620 may include statuses for "Number/Type/Workers," "In Process," "Complete," "Incomplete," "Refusal of Receipt," and "Classification," each of which provides different information.

"Number/Type/Workers" may indicate a status or description of a number and type of delivery worker. "In Process" may indicate the number of deliveries is currently being made. "Complete" may indicate the number of completed orders. "Incomplete" may indicate the number of incomplete deliveries. "Refusal of Receipt" may indicate that the number of recipients that refused to receive their orders. "Classification" 628 may indicate a total number of classifications that are available and currently being employed for real-time deliveries (e.g., the number of full-time workers vs. flex workers). Other GUI 600 graphical components are contemplated to allow for assignment and pre-assignment of delivery workers.

Pre-assignment operations for delivery workers may include retrieving, from a database, a plurality of delivery routes and a plurality of delivery sub-routes, wherein the delivery sub-routes are part of the delivery routes, calculating, based on the retrieval, a number of packages allocated to the delivery routes and the delivery sub-routes, and receiving, based on user input, a pre-assignment of workers available for deliveries including pre-assigned workers classified into a plurality of categories. Pre-assignment operations may also include comparing, based on the pre-assignment, the pre-assigned workers against the delivery routes and the delivery sub-routes, assigning, based on the comparison, the packages, the delivery routes, and the delivery sub-routes to the pre-assigned workers that are pre-classified into the categories, generating a plurality of candidate routes associated with the pre-assigned workers; and calibrating, based on the assignment and the generated candidate routes, the delivery sub-routes.

Figure 7:
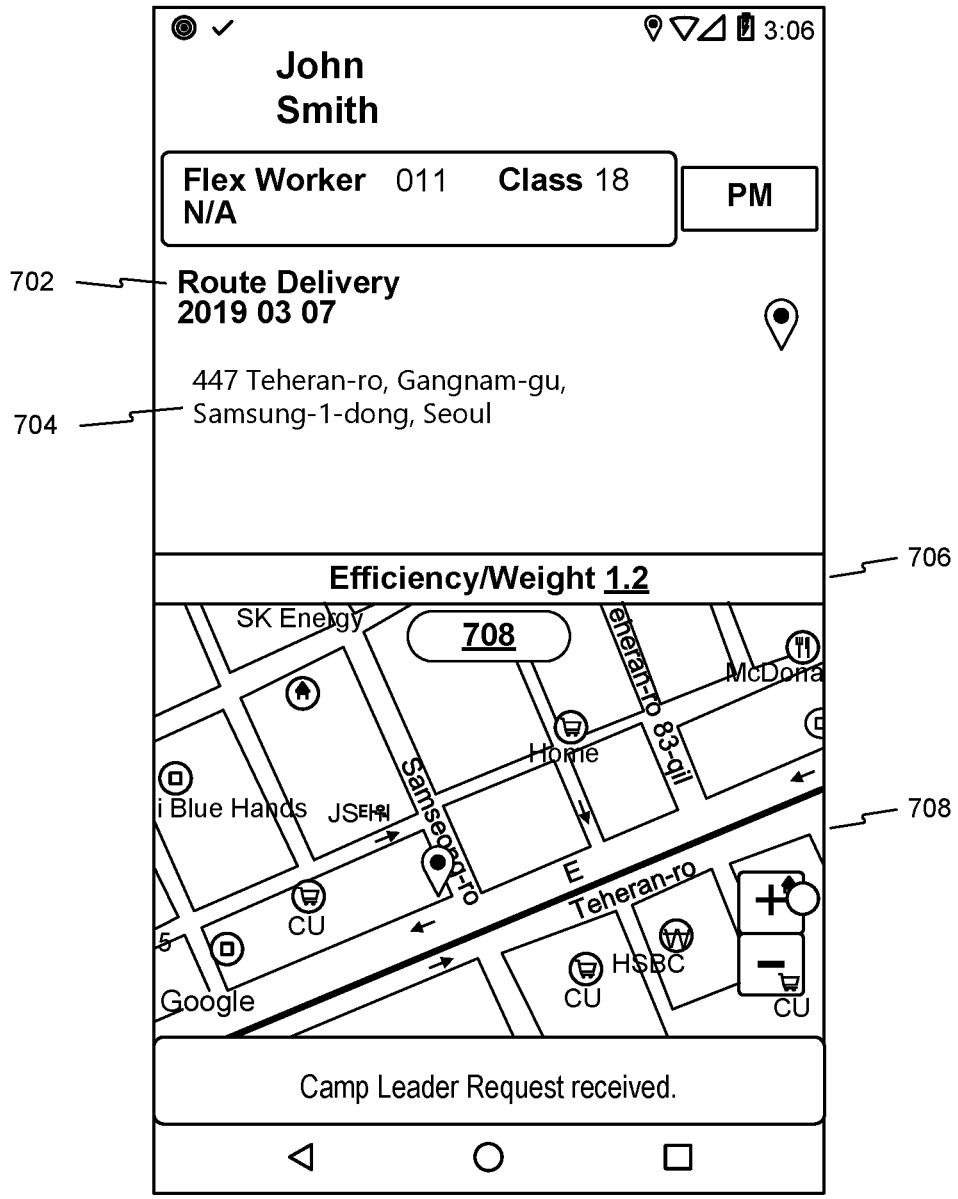
FIG. 7 is a diagrammatic illustration of a visual representation of a graphical user interface (GUI) on a mobile device, consistent with the disclosed embodiments.

FIG. 7 is a diagrammatic illustration of a visual representation of a graphical user interface (GUI) on a mobile device, consistent with the disclosed embodiments. As shown in FIG. 7, mobile device interface 700 may provide an interface similar to interface 600 but configured for display to a delivery worker. Mobile device interface 700 may be viewable by the delivery worker. For example, as shown in FIG. 7, mobile device interface 700 includes an interface assigned to a worker named "John Smith." Interface 700 includes John Smith's classification as "Flex Worker 608," indicates a delivery date 702 "2019 03 07" (i.e., Mar. 7, 2019), a delivery starting point or destination address 704 "447 Teheran-ro, Gangnam-gu, Samsung-1-dung, Seoul," includes an efficiency or weight rating 706 for the delivery worker and further includes a map 708 of the delivery proximity including roads, restaurants, and landmarks to guide the delivery worker. Other graphical components not shown may be contemplated and included for mobile device interface 700 in order to assist the delivery worker with his delivery.

Figure 8:
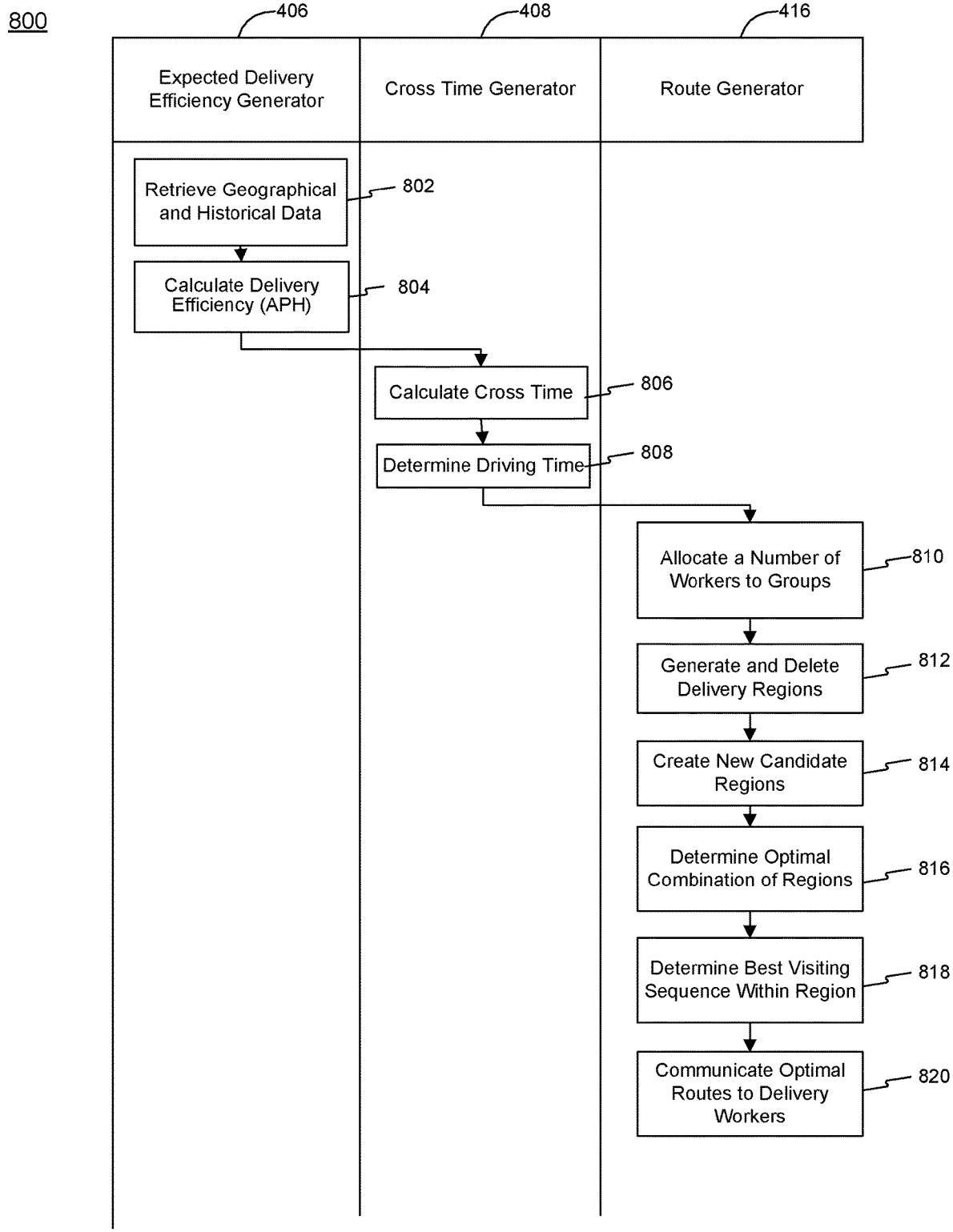
FIG. 8 is a flow chart illustrating an exemplary process for assigning delivery workers and managing delivery routes, consistent with the disclosed embodiments.

FIG. 8 is a flow chart illustrating an exemplary process for assigning delivery workers and managing delivery routes, consistent with the disclosed embodiments. While the exemplary method 800 is described herein as a series of steps, it is to be understood that the order of the steps may vary in other implementations. In particular, steps may be performed in any order, or in parallel.

At step 802, expected delivery efficiency generator 406 may retrieve geographical data 402 and historical data 404 from database 401. Geographical data 402 and historical data 404 may each include a plurality of delivery routes and a plurality of delivery sub-routes. Expected delivery efficiency generator 406 may receive geographical data 402 associated with a plurality of pre-defined regions and a plurality of sub-regions. Geographical data 402 may include at least one of landscape data, business data, residential data, parking data, or building data. Sub-routes or sub-regional data may exist as part of a route or regional data. Historical data 404 may data relating to past deliveries, including one or more of a delivery location, delivery time, delivery driver, and/or delivery package.

At step 804, expected delivery efficiency generator 406 may calculate, based on the retrieved geographical data 402 and historical data 404, an expected delivery efficiency (APH value). Expected delivery efficiency generator 406 may make its calculation also based on a number of packages allocated to retrieved delivery routes and the delivery sub-routes. Expected delivery efficiency generator 406 may determine an expected delivery efficiency, the expected delivery efficiency being measured by percentiles of addresses visited by the workers per hour (APH). Expected delivery efficiency generator 406 may further calculate, based on historical data 404, the APH for selected individual pre-defined regions and sub-regions. In some embodiments, cross time generator 408 may calculate percentile values of APH in each region and sub-region based on historical data 404. In some embodiments, a specific percentile may be determined as an expected delivery efficiency (e.g. $60^{th}$ percentile). In other aspects, an expected delivery efficiency may factor in time for delivery and the skill or experience of a delivery worker.

At step 806, cross time generator 408 may implement historical cross time generation module 410 to calculate an expected time for the workers to travel between first and second regions 502, 504 (as shown in FIG. 5), wherein the expected time includes a cross-region time 501 and a sub-region 502, 504 time based on a median time gap or an average time determine. Historical cross time generation module 410 may use the median time gap between two regions or sub-regions within a time period of the last three months. This time period may include the delivery time of an order and not merely a crossing time. Where no median time gap exists or where a number of data samples is not greater than 2, historical cross time generation module 410 may implement the average cross region/sub-region time within a camp zone 215.

At step 808, cross time completion and calibration module 412 in cross time generator 408 may determine a "driving time" 506, "parking time 508", "sorting time" 510, and "delivering time" 512. Cross time completion and calibration module 412 may communicate with map service module 430 to obtain a "driving time" 506 between any two regions or sub-regions. Cross time completion and calibration module 412 may then perform a linear regression to obtain a mathematical relationship between a "driving time" and a cross time 501. Cross lime completion and calibration module 412 may utilize the obtained mathematical relationship and the driving time obtained from map service module 430 to determine a cross time 501 and develop a cross time 501 matrix of time values. Cross time completion and calibration module 412 may further utilize the developed matrix of time values to finalize, complete, and calibrate a new calculated cross time 501.

At step 810, route generator 416 may allocate a number of delivery workers to groups. Route generator 416 may receive from devices 119A-C, user configurations and preferences 414 input, and a number and a type of workers available for deliveries, wherein the type includes classification characteristics and efficiency characteristics associated with the workers. User input may include manual entry of information at a GUI. Each worker may be classified by based on user configurations and preferences 414 into one of a "half-day," "walk-man," "newbie," or "senior delivery worker." Each type of delivery worker may be weighted differently based on efficiencies associated with their classification. Route generator 416 may classify (or allocate) the workers into at least one of a plurality of categories (or groups) according to classification characteristics, and weigh, based on the classification characteristics, the delivery workers according to the efficiency characteristics. Weights may be used to determine how many packages a particular user can take during a time period For example, a half-day delivery worker may deliver and transport half as many packages (i.e., 50%) as many as a normal delivery worker (100%), while a senior delivery worker may take 120% of the packages as in comparison to a normal delivery worker. The weights may be based on the number of expected packages for delivery for each worker. Other weights may be contemplated, and the classification characteristics may include at least one of experience or efficiency.

Attendance allocation optimization module 418 in route generator 416 may allocate a number of delivery workers to groups, based on the calculated number of packages in addition to the received user input. Attendance allocation optimization module 418 may further assign delivery workers to a plurality of groups, wherein the groups correspond to different delivery routes and different delivery sub-routes. This may include allocating a number of workers to the groups based on the user input including a package distribution and an attendance value. As an example, where there are 50 delivery workers and four groups, attendance allocation optimization module 418 may decide that "Group 1" includes 10 delivery workers, and attendance allocation optimization module 418 will generate 10 delivery routes for the 10 delivery workers. Subsequently, after the delivery 10 routes are generated, a camp leader may decide which worker is allocated to which group and route. For instance, a camp leader may determine "Bob" will occupy "Route 1" in "Group 1" and "Steve" will occupy "Route 2" in "Group 1" and may make this assignment based on user input in a user interface (FIG. 6). Consistent with the disclosure, attendance allocation optimization module 418 may also assign available packages and sub-routes to delivery workers who are pre-assigned into particular groups. This assignment may transfer that task of sorting products in a delivery truck from the drivers to the helpers in the camp zone 215, thus improving the efficiency of the dynamic delivery process.

Attendance allocation optimization module 418 may compare, based on the assignment, the assigned workers against the delivery routes and the delivery sub-routes. Attendance allocation optimization module 418 may also determine a number of packages per route and sub-route. Attendance allocation optimization module 418 may perform an attendance assignment, which assigns workers to different groups, and calculate an average deviation value of the groups based on an average value of packages per worker delivery. This calculation may be performed so as to minimize the average deviation of the group's average packages per driver (ppd) from the camp's average ppd. As discussed above, attendance allocation optimization module 418 may decide the number of delivery workers per group, and attendance allocation optimization module 418 may generate a number of routes corresponding to the number of delivery workers allocated to a particular group. Subsequently, after delivery routes are generated, a camp leader may decide which worker is allocated to which group and route. In other embodiments, delivery workers may be pre-assigned into groups rather than assigned based on attendance allocation optimization module 418 and attendance assignment. Consistent with this disclosure, a camp leader may enter delivery worker information into an interface (FIG. 6) to pre-assign workers.

In some aspects, other pre-assignment operations for delivery workers may include retrieving, from a database, a plurality of delivery routes and a plurality of delivery sub-routes, wherein the delivery sub-routes are part of the delivery routes, calculating, based on the retrieval, a number of packages allocated to the delivery routes and the delivery sub-routes, and receiving, based on user input, a pre-assignment of workers available for deliveries including pre-assigned workers classified into a plurality of categories. Pre-assignment operations may also include comparing, based on the pre-assignment, the pre-assigned workers against the delivery routes and the delivery sub-routes, assigning, based on the comparison, the packages, the delivery routes, and the delivery sub-routes to the pre-assigned workers that are pre-classified into the categories, generating a plurality of candidate routes associated with the pre-assigned workers; and calibrating, based on the assignment and the generated candidate routes, the delivery sub-routes. Pre-assignment operations may further occur in advance of the delivery day. For example, workers may be pre-assigned into groups in advance of delivery day including the day before delivery, the week before delivery, or may permanently be pre-assigned into groups in advance of delivery day. Other pre-assignment time periods and schedules may be contemplated.

Consistent with this disclosure, a camp leader (using a mobile device) or route generator 416 (including attendance allocation optimization module 418) may determine delivery routes and delivery sub-routes based on results from historical data and optimized map data optimization. Attendance allocation optimization module 418 may also determine delivery regions and delivery sub-regions associated with the delivery routes and the delivery sub-routes and may combine the delivery regions and the delivery sub-regions into new regions for delivery. Attendance allocation optimization module 418 may further determine candidate regions and candidate delivery sub-regions associated with the candidate routes, combine the candidate regions and the candidate delivery sub-regions into new regions for delivery, and determine a combination of the candidate delivery regions and the candidate delivery sub-regions based on a calculated expected delivery efficiency value and a calculated cross-region time. Attendance allocation optimization module 418 may also allocate the workers into at least one of the plurality of categories according to classification characteristics; and weigh, based on the classification characteristics, the workers according to efficiency characteristics. Other pre-assignment operations and arrangements may be contemplated.

At step 812, seed distribution generation module 420 in route generator 416 may create regions and may delete excessive regions. Seed distribution generation module 420 may generate regions based on rules configured by users and based on classifications of delivery workers. (e.g. "low-top," "workman-preferred," and "other rules"). As discussed above, the "low-top" classification may indicate a delivery worker who has experience loading deliveries in vehicles with lower tops, as opposed to large trucks. The "workman-preferred" classification may indicate a delivery worker who possess all sorts of handyman or loading skills, and who can perform all different types of tasks with varied complexity. The "other rules" classification may indicate other rules that may be specified based on a specific delivery requirement at hand. Seed distribution generation module 420 may generate delivery regions and delivery sub-regions associated with the classifications, delivery routes, and delivery sub-routes, may combine the generated delivery regions and the generated delivery sub-regions, and may remove the generated delivery regions and the generated delivery sub-regions. Seed distribution generation module 420 may also generate delivery routes and delivery sub-routes based on classification, historical data, and map data optimization.

At step 814, re-distribution optimization module 422 in route generator 416 may create new candidate regions based on regions generated or deleted by seed distribution generation module 420. Re-distribution optimization module 422 may also create new candidate delivery regions and candidate delivery sub-regions associated with candidate routes. Re-distribution optimization module 422 may also perform route balancing by generating candidate routes for each classification of worker. Re-distribution optimization module 422 may further modify a quantity of the delivery routes and a quantity of the delivery sub-routes generated by seed distribution generation module 420 to match an amount of the assigned workers. Re-distribution optimization module 422 may increase or decrease the quantity of the delivery routes and increase or decrease the quantity of the delivery sub-routes to match the amount of the assigned workers. This modification may be a heuristic method performed to reduce the complexity of the route balancing problem. For example, as discussed above, assigned delivery workers may be compared to routes to assign, and re-distribution optimization module 422 may attempt to equalize the two by adding or removing routes from the delivery.

At step 816, re-distribution optimization module 422 in route generator 416 may determine an optimal combination of regions. Re-distribution optimization module 422 may combine the generated candidate delivery regions and the generated candidate delivery sub-regions, remove the generated candidate regions and the generated candidate delivery sub-regions, and determine a combination of the generated candidate delivery regions and the generated candidate delivery sub-regions to minimize a delivery cost. Re-distribution optimization module 422 may redistribute at least one of candidate delivery regions and candidate delivery sub-regions to minimize a delivery cost. Re-distribution optimization module 422 may determine an optimal combination of regions based on solving the "0/1 programming model" (as discussed with reference to FIG. 4). Other optimization techniques may be contemplated and implemented.

At step 818, visiting sequence optimization module 424 in route generator 416 may determine a best visiting sequence within a region. Visiting sequence optimization module 424 may calibrate, based on the modified quantities and the generated candidate routes, selected delivery sub-routes. Visiting sequence optimization module 424 may automatically select one or more of the delivery sub-routes for delivery and worker assignment. Visiting sequence optimization module 424 may perform a sub-route visiting sequence adjustment in order to keep certain sub-routes together. Other adjustments may be performed to keep sub-routes together. Additionally, visiting sequence optimization module 424 may receive input relating to package (parcel) distribution 426 after visiting sequence optimization in order to generate optimal routes 428 (as shown in FIG. 4) and implement the best visiting sequence within a region.

At step 820, route generator 416 may communicate optimal routes 428 to devices 119A-C (as shown in FIGS. 1, 4, and 8). The optimal routes may include optimal routes and sub-routes to guide delivery workers to efficiently deliver assigned delivery packages.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system comprising:
a memory for storing instructions; and
at least one processor configured to execute the instructions to:
retrieve geographical data and historical delivery data from a database, the geographical data comprising data on pre-defined regions and sub-regions;
determine, based on the geographical data, an expected delivery efficiency;
determine candidate delivery regions and candidate delivery sub-regions;
combine the candidate delivery regions and the candidate delivery sub-regions into new regions for delivery;
receive data comprising groups of workers available for deliveries, the workers being classified into a plurality of categories;
assign packages, delivery routes, and delivery sub-routes to the workers;
generate a plurality of candidate routes associated with the candidate delivery regions, the candidate delivery sub-regions, the new regions, and the workers;
calibrate, based on the assignment and the generated candidate routes, the delivery sub-routes;
transmit over a network, for display in a graphical user interface (GUI), at least one of the delivery sub-routes to an electronic device associated with a delivery worker, the electronic device configured for scanning at least one package identifier and capturing data associated with the packages upon delivery;
receive over the network, the scanned at least one package identifier and captured delivery data from the electronic device relating to the delivery, wherein the scanned at least one package identifier and captured delivery data are stored in the database as updated historical delivery data;
recalculate, based on the updated historical delivery data, the expected delivery efficiency for selected individual pre-defined regions and sub-regions;
recalibrate, based on the recalculated expected delivery efficiency, at least one of the calibrated delivery sub-routes; and
transmit over the network, for display in a graphical user interface (GUI), at least one of the recalibrated delivery sub-routes to an electronic device associated with a delivery worker.

2. The system of claim 1, wherein the at least one processor is further configured to execute the instructions to:
determine the delivery routes and delivery sub-routes based on the stored historical delivery data and optimized map data.

3. The system of claim 1, wherein the at least one processor is further configured to execute the instructions to:
calculate an average deviation value of the received groups of workers from an average value of packages per worker delivery.

4. The system of claim 1, wherein the at least one processor is further configured to execute the instructions to:
receive a type of worker available for deliveries, wherein the type includes at least one of experience or efficiency.

5. The system of claim 1, wherein the at least one processor is further configured to execute the instructions to:
receive a number and a type of workers available for deliveries, from user input via a graphical user interface (GUI) from at least one of a web browser or an electronic device.

6. The system of claim 5, wherein the user input includes a package distribution and an attendance value.

7. The system of claim 1, wherein the at least one processor is further configured to execute the instructions to:
receive data comprising groups of pre-assigned workers available for deliveries, the pre-assigned workers being classified into a plurality of categories.

8. A method for attendance assignment, the method comprising:
retrieving geographical data and historical delivery data from a database, the geographical data comprising data on pre-defined regions and sub-regions;
determining by at least one processor, based on the geographical data, an expected delivery efficiency;
determining by the at least one processor, candidate delivery regions and candidate delivery sub-regions;
combining by the at least one processor, the candidate delivery regions and the candidate delivery sub-regions into new regions for delivery;
receiving by the at least one processor, data comprising groups of workers available for deliveries, the workers being classified into a plurality of categories;
assigning by the at least one processor, packages, delivery routes, and delivery sub-routes to the workers;
generating by the at least one processor, a plurality of candidate routes associated with the candidate delivery regions, the candidate delivery sub-regions, the new regions, and the workers;

calibrating by the at least one processor, based on the assignment and the generated candidate routes, the delivery sub-routes;

transmitting by the at least one processor over a network for display, at least one of the delivery sub-routes to an electronic device associated with a delivery worker, the electronic device configured for scanning at least one package identifier and capturing data associated with the packages upon delivery;

receiving by the at least one processor over the network, the scanned at least one package identifier and captured delivery data from the electronic device relating to the delivery, wherein the scanned at least one package identifier and captured delivery data are stored as updated historical delivery data in the database;

recalculating by the at least one processor, based on the updated historical delivery data, the expected delivery efficiency for selected individual pre-defined regions and sub-regions;

recalibrating by the at least one processor, based on the recalculated expected delivery efficiency, at least one of the calibrated delivery sub-routes; and transmitting by the at least one processor, over the network, for display, at least one of the recalibrated delivery sub-routes to an electronic device associated with a delivery worker.

9. The method of claim 8, the method further comprising:
determining by the at least one processor, the delivery routes and delivery sub-routes based on the stored historical delivery data and optimized map data.

10. The method of claim 8, the method further comprising:
calculating by the at least one processor, an average deviation value of the received groups of workers from an average value of packages per worker delivery.

11. The method of claim 8, the method further comprising:
receiving by the at least one processor, a type of worker available for deliveries, wherein the type includes at least one of experience or efficiency.

12. The method of claim 8, the method further comprising:
receiving by the at least one processor, a number and a type of workers available for deliveries, from user input via a graphical user interface (GUI) from at least one of a web browser or an electronic device.

13. The method of claim 12, wherein the user input includes a package distribution and an attendance value.

14. The method of claim 8, the method further comprising:
receiving by the at least one processor, data comprising groups of pre-assigned workers available for deliveries, the pre-assigned workers being classified into a plurality of categories.

15. A non-transitory computer-readable medium storing instructions that, when executed by a processor, cause the processor to perform operations comprising:
retrieving geographical data and historical delivery data from a database, the geographical data comprising data on pre-defined regions and sub-regions;

determining, based on the geographical data, an expected delivery efficiency;

determining candidate delivery regions and candidate delivery sub-regions;

combining the candidate delivery regions and the candidate delivery sub-regions into new regions for delivery;

receiving data comprising groups of workers available for deliveries, the workers being classified into a plurality of categories;

assigning packages, delivery routes, and delivery sub-routes to the workers;

generating a plurality of candidate routes associated with the candidate delivery regions, the candidate delivery sub-regions, the new regions, and the workers;

calibrating, based on the assignment and the generated candidate routes, the delivery sub-routes;

transmitting over a network, for display, at least one of the delivery sub-routes to an electronic device associated with a delivery worker, the electronic device configured for scanning at least one package identifier and capturing data associated with the packages upon delivery;

receiving over the network, the scanned at least one package identifier and captured delivery data from the electronic device relating to the delivery, wherein the scanned at least one package identifier and captured delivery data are stored as updated historical delivery data in the database;

recalculating, based on the updated historical delivery data, the expected delivery efficiency for selected individual pre-defined regions and sub-regions;

recalibrating, based on the recalculated expected delivery efficiency, at least one of the calibrated delivery sub-routes; and transmitting over the network, for display, at least one of the recalibrated delivery sub-routes to an electronic device associated with a delivery worker.

16. The non-transitory computer-readable medium of claim 15, the operations further comprising:
determining the delivery routes and delivery sub-routes based on the historical delivery data and optimized map data.

17. The non-transitory computer-readable medium of claim 15, the operations further comprising:
calculating an average deviation value of the received groups of workers from an average value of packages per worker delivery.

18. The non-transitory computer-readable medium of claim 15, the operations further comprising:
receiving a type of worker available for deliveries, wherein the type includes at least one of experience or efficiency.

19. The non-transitory computer-readable medium of claim 15, the operations further comprising:
receiving, a number and a type of workers available for deliveries, from user input via a graphical user interface (GUI) from at least one of a web browser or an electronic device.

20. The non-transitory computer-readable medium of claim 19, wherein the user input includes a package distribution and an attendance value.

* * * * *